(12) United States Patent
Harada et al.

(10) Patent No.: US 10,343,533 B2
(45) Date of Patent: Jul. 9, 2019

(54) POWER SUPPLY SYSTEM WITH IMPROVED ENERGY RECOVERY FROM REGENERATIVE BRAKING

(75) Inventors: Shigeki Harada, Tokyo (JP); Yusuke Higaki, Tokyo (JP); Yuuya Tanaka, Tokyo (JP); Yasuyoshi Hori, Tokyo (JP); Masaki Yamada, Tokyo (JP); Toshiyuki Yoshizawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 356 days.

(21) Appl. No.: 14/009,804

(22) PCT Filed: Apr. 8, 2011

(86) PCT No.: PCT/JP2011/058877
§ 371 (c)(1),
(2), (4) Date: Oct. 4, 2013

(87) PCT Pub. No.: WO2012/137343
PCT Pub. Date: Oct. 11, 2012

(65) Prior Publication Data
US 2014/0021920 A1 Jan. 23, 2014

(51) Int. Cl.
*H02J 7/00* (2006.01)
*B60L 11/18* (2006.01)
(Continued)

(52) U.S. Cl.
CPC .............. *B60L 11/1812* (2013.01); *B60L 7/10* (2013.01); *B60L 53/22* (2019.02); *H02J 7/1492* (2013.01);
(Continued)

(58) Field of Classification Search
CPC .................................................. H02J 7/1492
(Continued)

(56) References Cited

U.S. PATENT DOCUMENTS

| 5,596,258 A | 1/1997 | Kimura et al. |
| 5,939,794 A * | 8/1999 | Sakai ................. B60K 6/46 |
| | | 290/40 A |

(Continued)

FOREIGN PATENT DOCUMENTS

| CN | 201369576 Y | 12/2009 |
| DE | 600 05 914 T2 | 8/2004 |

(Continued)

OTHER PUBLICATIONS

Power Electronics Handbook, 2nd Edition, by: Muhammad H. Rashid Publisher: Academic Press Pub. Date: Nov. 8, 2006.*

(Continued)

*Primary Examiner* — Drew A Dunn
*Assistant Examiner* — Harry O'Neill-Becerril
(74) *Attorney, Agent, or Firm* — Oblon, McClelland, Maier & Neustadt, L.L.P.

(57) ABSTRACT

A first DC/DC converter is of a constant voltage control type and is controlled so as to keep the voltage of an electric generation bus at a predetermined target value. A second DC/DC converter is of a constant current control type and is controlled so as to keep input current or output current at predetermined target current. A control circuit determines an optimum target value of electric generation bus voltage, based on different algorithms, in accordance with all or some of modes A to C which are classified by the charging/discharging condition of a second electric storage device, and controls the first DC/DC converter so that the electric generation bus voltage becomes the determined target value.

6 Claims, 14 Drawing Sheets

(51) Int. Cl.
*H02J 7/14* (2006.01)
*B60L 7/10* (2006.01)
*B60L 53/22* (2019.01)

(52) U.S. Cl.
CPC ........ *B60L 2240/427* (2013.01); *Y02T 10/642* (2013.01); *Y02T 10/7005* (2013.01); *Y02T 10/7072* (2013.01); *Y02T 10/92* (2013.01); *Y02T 90/127* (2013.01); *Y02T 90/14* (2013.01)

(58) Field of Classification Search
USPC ........................................................ 320/109
See application file for complete search history.

(56) References Cited

U.S. PATENT DOCUMENTS

| | | | | |
|---|---|---|---|---|
| 6,060,864 | A | * | 5/2000 | Ito ................... G01R 19/16542 320/134 |
| 6,114,775 | A | * | 9/2000 | Chung .................... B60K 6/46 180/65.245 |
| 6,233,935 | B1 | | 5/2001 | Kahlon et al. |
| 6,364,042 | B1 | | 4/2002 | Joachim |
| 2002/0038733 | A1 | * | 4/2002 | Obayashi ............... B60K 6/485 180/65.26 |
| 2003/0222502 | A1 | | 12/2003 | Takahashi et al. |
| 2004/0112320 | A1 | | 6/2004 | Bolz et al. |
| 2010/0026237 | A1 | * | 2/2010 | Ichikawa ................ B60L 11/12 320/109 |
| 2010/0244556 | A1 | | 9/2010 | Bolz et al. |
| 2011/0100735 | A1 | * | 5/2011 | Flett ........................ B60K 6/46 180/65.22 |
| 2012/0158245 | A1 | | 6/2012 | Yoshizawa et al. |
| 2013/0264868 | A1 | | 10/2013 | Higaki et al. |
| 2014/0081500 | A1 | * | 3/2014 | Ito ........................ B60K 6/445 701/22 |

FOREIGN PATENT DOCUMENTS

| | | |
|---|---|---|
| DE | 601 18 112 T2 | 11/2006 |
| DE | 10 2007 048 342 A1 | 4/2009 |
| JP | 3465293 | 11/2003 |
| JP | 2008-230405 | 10/2008 |
| JP | 2010-104123 A | 5/2010 |
| JP | 4497145 | 7/2010 |
| WO | 2011 046147 | 4/2011 |

OTHER PUBLICATIONS

International Search Report dated Jun. 14, 2011 in PCT/JP11/058877 filed Apr. 8, 2011.
Combined Office Action and Search Report dated Jan. 23, 2015 in Chinese Patent Application No. 201180069563.0 (with partial English language translation and English Translation of Category of Cited Documents).
U.S. Appl. No. 14/116,518, filed Nov. 8, 2013, Tanaka, et al.
Office Action dated Mar. 27, 2017 in German Patent Application No. 11 2011 105 135.2 (with Partial English-language Translation).

\* cited by examiner

POWER SUPPLY SYSTEM WITH IMPROVED ENERGY RECOVERY FROM REGENERATIVE BRAKING

TECHNICAL FIELD

The present invention relates to a power supply system for vehicle, and particularly, to a power supply system for vehicle that can realize regeneration of braking energy of a vehicle and improvement in fuel efficiency of the vehicle.

BACKGROUND ART

Among conventional power supply systems for vehicle of this type, a power supply system for vehicle has been proposed which, upon deceleration of a vehicle, aggressively performs regeneration of braking energy by setting the voltage of generated power of an electric generator which is driven by an engine and feeds power to a battery, to be higher than the voltage upon non-deceleration, and meanwhile, upon non-deceleration of the vehicle, reduces load on the engine to improve fuel efficiency by setting the voltage of generated power of the electric generator to be lower than the voltage upon deceleration (for example, see Patent Document 1 shown below).

CITATION LIST

Patent Document

Patent Document 1: Japanese Laid-Open Patent Publication No. 2008-67504

SUMMARY OF THE INVENTION

Problems to be Solved by the Invention

However, since the conventional power supply system for vehicle described in the above Patent Document 1 is configured to charge the battery by directly supplying generated power of the electric generator to the battery, too much increase of the voltage of generated power of the electric generator upon deceleration of a vehicle leads to reduction in the life of the battery. Therefore, generated power of the electric generator upon deceleration cannot be increased to aggressively regenerate braking energy, and the amount of electric storage into the battery decreases. As a result, the effect of improving fuel efficiency is suppressed to be low.

The present invention has been made to solve such a problem, and the object of the present invention is to obtain a power supply system for vehicle capable of increasing generated power of an electric generator upon deceleration of a vehicle while suppressing reduction of the life of a battery, and suppressing the amount of generated power of the electric generator upon non-deceleration of the vehicle, thereby realizing improvement in fuel efficiency of the vehicle.

Solution to the Problems

A power supply system for vehicle according to the present invention includes: an electric generator driven by an engine, for generating AC power; a rectifier for rectifying the AC power generated by the electric generator to DC power and outputting the DC power to an electric generation bus; a first electric storage device for supplying power to an in-vehicle load via a load feed bus; a second electric storage device for absorbing generated power from the electric generator, thereby absorbing power variation; a first DC/DC converter of a constant voltage control type, connected to the electric generation bus and controlled so as to keep electric generation bus voltage which is the voltage of the electric generation bus, at a predetermined target value; a second DC/DC converter of a constant current control type, connected to the second electric storage device and controlled so as to keep input current or output current at predetermined target current; and a control circuit for performing drive control for the electric generator and the first and the second DC/DC converters so as to charge the first electric storage device and the second electric storage device with generated power of the electric generator and discharge energy stored in the second electric storage device. The control circuit determines an optimum target value of the electric generation bus voltage, based on different algorithms, in accordance with all or some of modes which are classified by the charging/discharging condition of the second electric storage device, and controls the first DC/DC converter so that the electric generation bus voltage becomes the determined optimum target value.

Effect of the Invention

According to the power supply system for vehicle of the present invention, the generated power of the electric generator is not directly supplied to the first electric storage device. Therefore, reduction of the life of the first electric storage device can be suppressed. In addition, an optimum target value of the electric generation bus voltage of the electric generator for improving the fuel efficiency is selected based on different algorithms for the respective modes which are classified by the charging/discharging condition of the second electric storage device, and the first DC/DC converter is controlled so that the electric generation bus voltage becomes the target value. Therefore, the fuel efficiency can be more improved than in the conventional technique.

DESCRIPTION OF EMBODIMENTS

Embodiment 1

Figure 1:
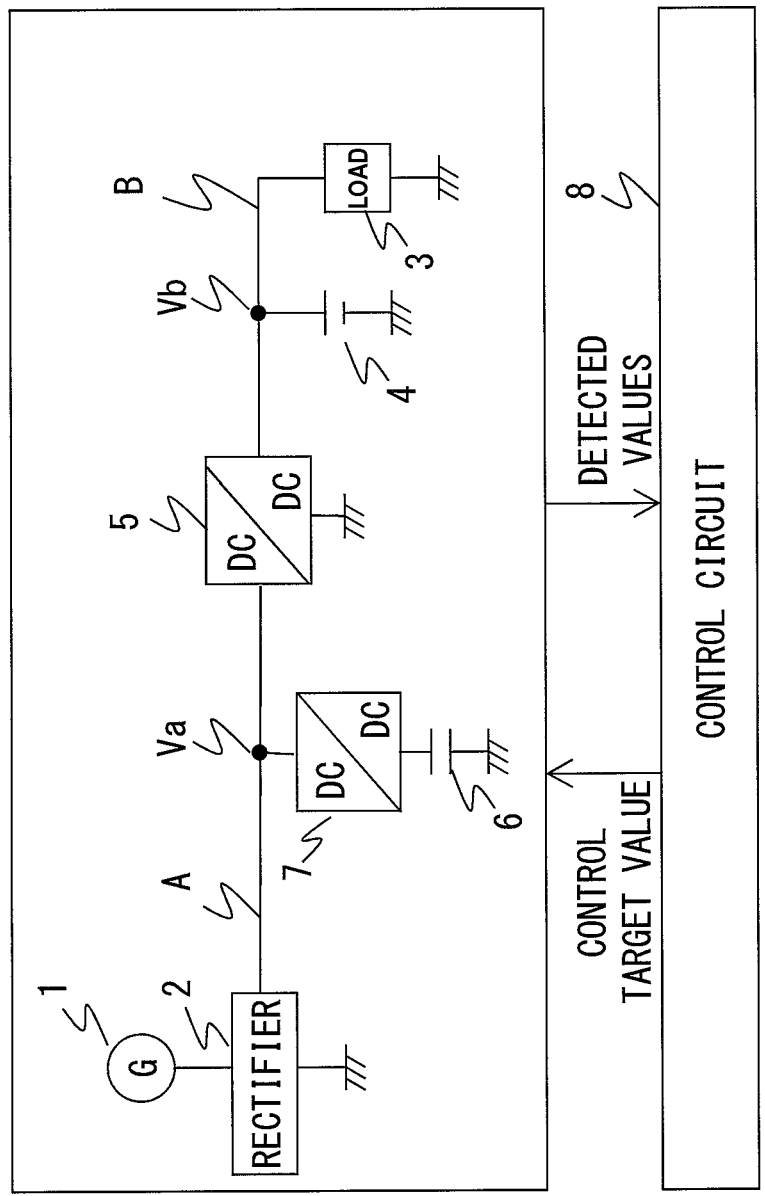
FIG. 1 is a block diagram showing the configuration of a power supply system for vehicle according to embodiment 1 of the present invention.

FIG. 1 is a block diagram showing the configuration of a power supply system for vehicle according to embodiment 1 of the present invention.

The power supply system for vehicle of embodiment 1 includes: an electric generator 1 driven by an engine (not shown), for generating AC power; a rectifier 2 for rectifying AC power generated by the electric generator 1 to DC power and outputting the DC power to an electric generation bus A; a first electric storage device 4 for supplying power to an in-vehicle load 3 via a load feed bus B; a second electric storage device 6 for storing generated power from the electric generator 1, thereby absorbing power variation; a first DC/DC converter 5 having a first end (input end) connected to the electric generation bus A and a second end (output end) connected to the load feed bus B; a second DC/DC converter 7 having a first end (input end) connected to the electric generation bus A and a second end (output end) connected to the second electric storage device 6; and a control circuit 8 for controlling the electric generator 1, the first DC/DC converter 5, and the second DC/DC converter 7.

The above electric generator 1 is, for example, a Lundell-type AC electric generator that includes a claw-pole-type rotor having a field winding, a stator having three-phase AC windings, and a regulator circuit. In addition, the rectifier 2 is composed of a three-phase full-wave rectification circuit, and rectifies AC power induced on the three-phase AC windings of the electric generator 1 to DC power.

As the first electric storage device 4, a secondary battery allowing charging with a large amount of energy per volume, such as a lead-acid battery, a nickel-cadmium battery, or a lithium-ion battery, is applied, and the rated current thereof is, for example, 14V.

The second electric storage device 6 serves a role of leveling supply power to the first electric storage device 4 side, by absorbing variation in generated power from the electric generator 1 and storing supply power for the first electric storage device 4 side, or compensating for deficiency of power of the first electric storage device 4, for example. As the second electric storage device 6, a large-capacity capacitor allowing charging and discharging with a large amount of power, such as an electric double layer capacitor, or a secondary battery such as a lithium-ion battery, is applied. It is noted that in the case of using an electric double layer capacitor as the second electric storage device 6, the rated voltage thereof is, for example, 28V.

As the first DC/DC converter 5, a DC/DC converter of a constant voltage control type that can keep a first end (input end) at predetermined voltage is applied. As such a DC/DC converter, for example, a general DC/DC converter circuit such as a step-down chopper circuit which is controlled by feedback control so as to keep the voltage of the first end (input end) at target voltage can be used.

Here, if (variation in input voltage)/(variation in input current) is assumed to be the input impedance of the first DC/DC converter 5, the first DC/DC converter 5 can be regarded as a DC/DC converter having a low input impedance because the first DC/DC converter 5 keeps input voltage to be constant irrespective of current.

On the other hand, as the second DC/DC converter 7, a DC/DC converter of a constant current type that keeps current flowing to the second electric storage device 6 at a predetermined target value, is applied. Also, the second DC/DC converter 7 needs to perform bidirectional operations including charging and discharging for the second electric storage device 6. Therefore, it is essential that the second DC/DC converter 7 is a DC/DC converter of a bidirectional type which allows the input-output direction to be inverted. As such a DC/DC converter of a bidirectional and constant-current type, a general DC/DC converter circuit such as a step-up/down chopper circuit which is controlled by feedback control so as to keep the current of the second electric storage device 6 at target current, can be used.

In addition, the second DC/DC converter 7 can be regarded as a DC/DC converter having a high input impedance because the second DC/DC converter 7 operates to keep input current to be constant irrespective of voltage.

It is noted that, here, for convenience of description, one of the input and output terminals of the second DC/DC converter 7 that is connected to the electric generation bus A is referred to as "input end", and the other one that is connected to the second electric storage device 6 is referred to as "output end", and thus they do not necessarily represent a transfer direction of power. For example, in the case where the second electric storage device 6 discharges via the second DC/DC converter 7, current flows in from the "output end" side and flows out from the "input end" side, and power transfers from the "output end" side to the "input end" side.

Here, when the electric generator 1, the rectifier 2, the first DC/DC converter 5, and the second DC/DC converter 7 are connected to the electric generation bus A, the internal impedances of the electric generator 1 and the rectifier 2 are sufficiently higher than that of the first DC/DC converter 5. In addition, the second DC/DC converter 7 also has a high input-output impedance as described above. Therefore, electric generation bus voltage Va can be set at a predetermined value by only controlling the first DC/DC converter 5 having the lowest input impedance. That is, the electric generation bus voltage Va can be kept at predetermined voltage by the control circuit 8 controlling the first DC/DC converter 5.

Thus, the reason that the electric generation bus voltage Va can be determined uniquely is because the first DC/DC converter 5 having a low impedance is connected to the electric generation bus A which is one circuit connection point.

The control circuit 8 detects and obtains the rotation rate of the rotor of the electric generator 1, the electric generation bus voltage Va applied to the electric generation bus A, load feed voltage Vb applied to the load feed bus B, voltage Vedlc of the second electric storage device 6, and current Ic of the second DC/DC converter 7 upon charging or discharging of the second electric storage device 6, and controls the electric generator 1, the first DC/DC converter 5, and the second DC/DC converter 7, based on the detected values.

Particularly, as a feature of embodiment 1, as described later in detail, since optimum electric generation bus voltage Va for the electric generator 1 differs depending on the charging/discharging condition (modes A to C) of the second electric storage device 6 upon travelling of a vehicle, the first DC/DC converter 5 is controlled so that optimum electric generation bus voltage Va corresponding to the charging/discharging condition (modes A to C) of the second electric storage device 6 can be obtained stably.

In the power supply system for vehicle configured as described above, the following three states (modes A to C) occur depending on the charging/discharging condition of the second electric storage device 6 upon travelling of a vehicle. Hereinafter, the characteristics of the modes A to C will be described with reference to FIGS. 2 to 5.

Figure 2:
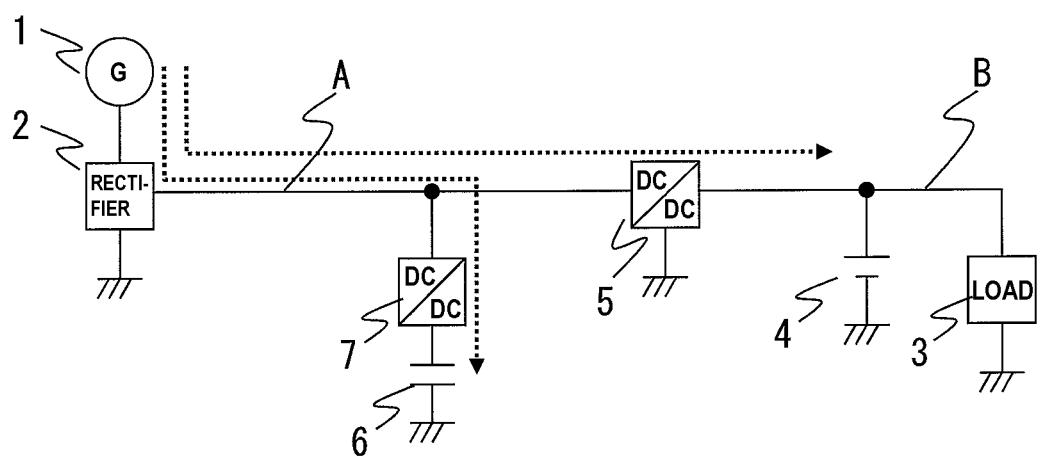
FIG. 2 is an explanation diagram showing an energy flow in a second electric storage device charging mode (A mode) in the power supply system for vehicle of embodiment 1.
Figure 3:
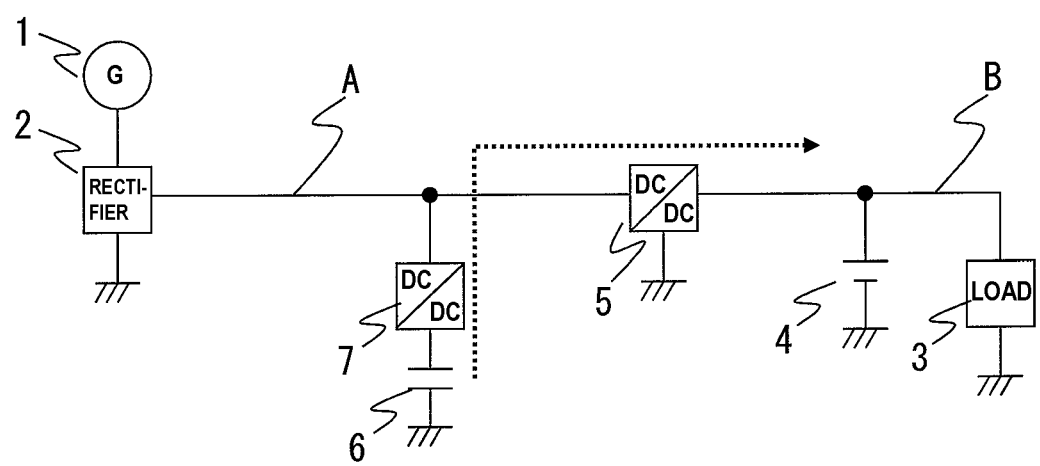
FIG. 3 is an explanation diagram showing an energy flow in a second electric storage device discharging mode (B mode) in the power supply system for vehicle of embodiment 1.
Figure 4:
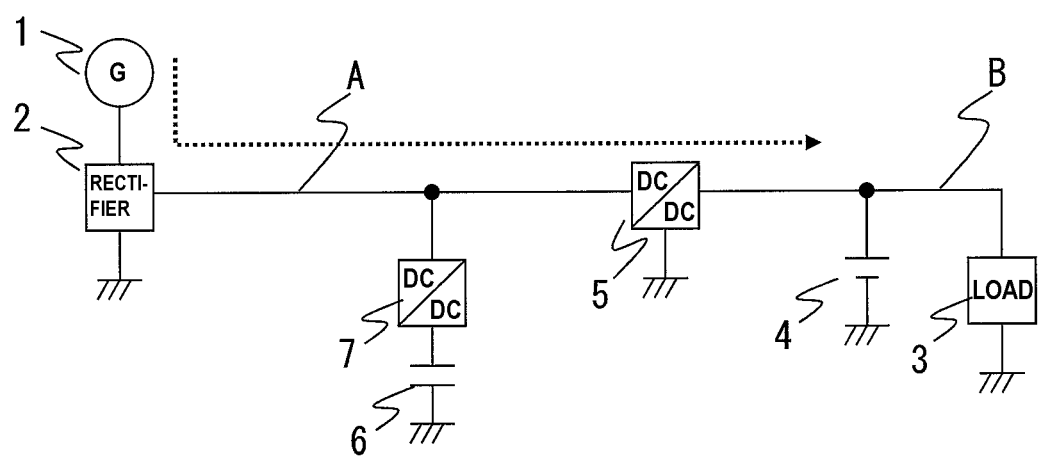
FIG. 4 is an explanation diagram showing an energy flow in a second electric storage device non-charging/discharging mode (C mode) in the power supply system for vehicle of embodiment 1.
Figure 5:
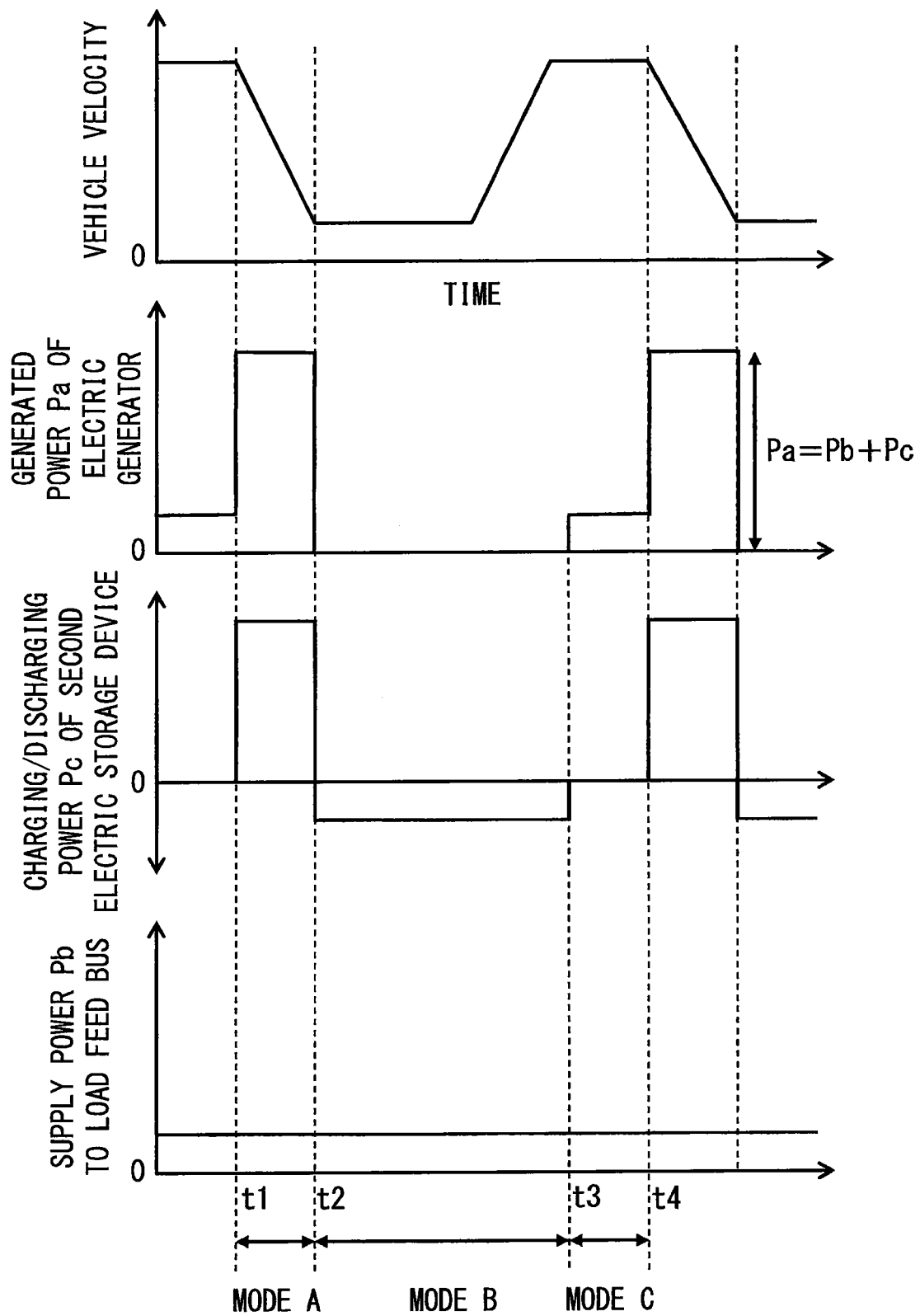
FIG. 5 is an explanation diagram showing the relationship among variation in a vehicle velocity, and generated power of an electric generator, charging/discharging power of a second electric storage device, and supply power to a load feed bus associated with the variation, in the power supply system for vehicle of the present invention.

FIGS. 2 to 4 are diagrams showing flows of energy in the respective modes A to C in the power supply system for vehicle. In addition, FIG. 5 shows variation in a vehicle velocity, and generated power Pa of the electric generator 1, charging/discharging power Pc of the second electric storage device 6, and supply power Pb to the load feed bus B associated with the variation. It is noted that the generated power Pa of the electric generator 1 is equal to a value obtained by summing the supply power Pb to the load feed bus B and the charging/discharging power Pc of the second electric storage device 6.

1. Mode A (Second Electric Storage Device Charging Mode)

The mode A mainly occurs upon deceleration of a vehicle (for example, in a period from a time t1 to a time t2 in FIG. 5).

That is, when a vehicle decelerates, the control circuit 8 controls the second DC/DC converter 7 so as to charge the second electric storage device 6. As a result, as shown in FIG. 2, energy generated by the electric generator 1 transfers through the first DC/DC converter 5 to the load feed bus B, and also transfers to the second electric storage device 6. At this time, since the source of regenerative energy generated by the electric generator 1 is kinetic energy based on the mass and the velocity of the vehicle, energy of gasoline is not consumed. If the regeneration of energy to the second electric storage device 6 upon deceleration is performed in a short time and with large power, the amount of regenerative power can be increased, and therefore the fuel efficiency can be more improved.

Therefore, in the mode A, it is desirable that the transfer of the generated power of the electric generator 1 to the second electric storage device 6 and the load feed bus B is performed in the state where the electric generator 1 can generate as large power as possible.

It is noted that there are cases that the mode A does not occur even upon deceleration, depending on other states. For example, such cases include the case where the voltage of the second electric storage device 6 (for example, an electric double layer capacitor) has reached its upper limit voltage so that the second electric storage device 6 cannot be charged any longer, and the case where the maximum generated power of the electric generator 1 is equal to power to be supplied to the load feed bus B and therefore power cannot be supplied to the second electric storage device 6.

2. Mode B (Second Electric Storage Device Discharging Mode)

The mode B mainly occurs in the case where a vehicle is in a state other than deceleration and the second electric storage device 6 is able to discharge (for example, in a period from a time t2 to a time t3 in FIG. 5).

That is, when deceleration of a vehicle has ended, the control circuit 8 controls the second DC/DC converter 7 so as to discharge energy of the second electric storage device 6. If the second electric storage device 6 can supply power to the electric generation bus A side, the control circuit 8 stops supplying current to the field winding of the electric generator 1, and therefore the electric generator 1 stops its electric generation, whereby energy transfers from the second electric storage device 6 to the load feed bus B side as shown in FIG. 3. Thus, in the mode B, since supply of power to the load feed bus B side including the in-vehicle load 3 is performed by the stored energy of the second electric storage device 6, energy of gasoline is not consumed for supplying power to the load feed bus B side.

Therefore, in the mode B, for efficient transfer of energy from the second electric storage device 6 to the load feed bus B side, it is desirable that the transfer is performed in the state where the power conversion efficiencies of the first DC/DC converter 5 and the second DC/DC converter 7 are maximized.

It is noted that the mode B ends when the voltage of the second electric storage device 6 has reached its lower limit voltage (a time t3 in FIG. 5) and therefore has become unable to discharge any longer.

3. Mode C (Second Electric Storage Device Non-Charging/Discharging Mode)

The mode C mainly occurs in the case where a vehicle is in a state other than deceleration and the second electric storage device 6 is not able to discharge (for example, in a period from a time t3 to a time t4 in FIG. 5).

That is, when the voltage of the second electric storage device 6 has reached its lower limit voltage (a time t3 in FIG. 5) and therefore has become unable to discharge any longer, the control circuit 8 stops operation of the second DC/DC converter 7. In addition, in this case, since current is supplied to the field winding of the electric generator 1, the electric generator 1 generates only power of an amount needed for supplying power to the load feed bus B, so that energy transfers as shown in FIG. 4. At this time, if a vehicle is not decelerating, only energy of gasoline of an amount needed for supplying power to the load feed bus B side is consumed. Therefore, in the mode C, for suppressing energy consumption of gasoline as much as possible, it is desirable that the above operation is performed in the state where the power generation efficiency of the electric generator 1 is maximized.

Then, by optimizing distribution of the above modes A and B so as to reduce as much as possible the time proportion of the mode C which consumes energy of gasoline, the fuel efficiency of the system as a whole can be improved. This is a basic principle of fuel efficiency improvement in the system, of the present embodiment.

Next, specific ways, i.e., conditions for optimally setting the electric generation bus voltage Va in accordance with the above respective characteristics required in the modes A to C, will be described.

1. Case of Mode A (Second Electric Storage Device Charging Mode)

In the mode A, as shown in FIG. 2, regenerative power of the electric generator 1 upon deceleration of a vehicle is used, and therefore the electric generator 1 is required to generate large power.

Figure 6:
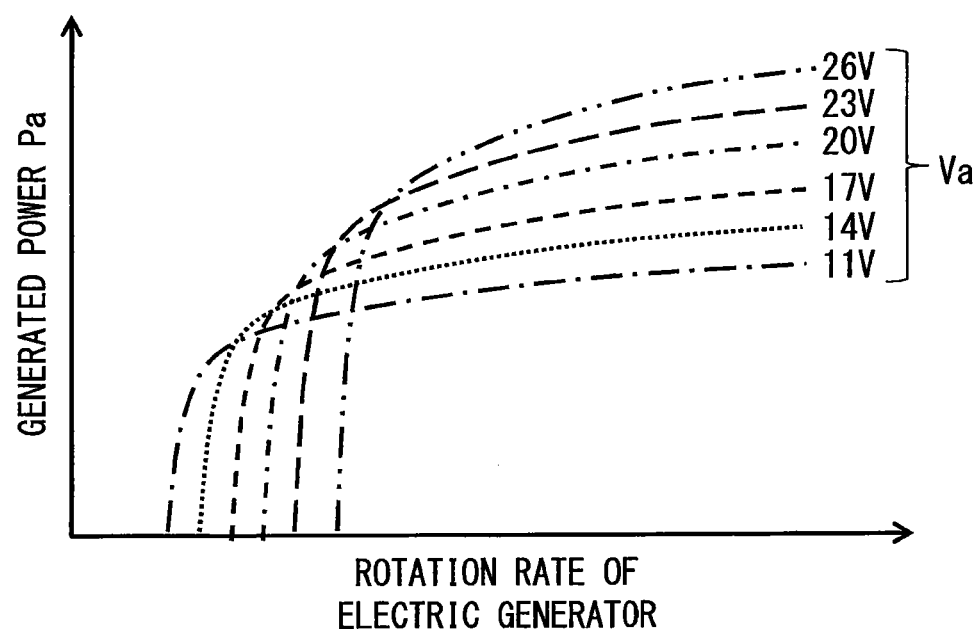
FIG. 6 is a characteristic diagram showing the relationship of generated power relative to the rotation rate of the electric generator used in the power supply system for vehicle of the present invention.

FIG. 6 is a characteristic diagram showing the relationship between the rotation rate and the generated power Pa of the electric generator 1 when the electric generation bus voltage Va is 11V, 14V, 17V, 20V, 23V, and 26V.

As shown in FIG. 6, there is a characteristic that in the case where the electric generation bus voltage Va is constant, when the rotation rate of the electric generator 1 is equal to or smaller than a predetermined minimum value, the generated power Pa is zero, and once the rotation rate exceeds the predetermined minimum value, the generated power Pa gradually increases as the rotation rate increases, to converge at a constant value eventually. In addition, it is found that the electric generation bus voltage Va that causes the maximum generated power Pa differs depending on the rotation rate of the electric generator.

It is noted that FIG. 6 shows the case where the field current of the electric generator 1 is constant. However, even if the field current changes, the relationship of the electric generation bus voltage Va that causes the maximum generated power Pa at each rotation rate does not change. Therefore, it is found that in the mode A, the electric generation bus voltage Va that allows generation of the maximum power at each rotation rate of the electric generator 1 may be used as a target value.

2. Case of Mode B (Second Electric Storage Device Discharging Mode)

In the mode B, as shown in FIG. 3, energy transfers from the second electric storage device 6 through the second DC/DC converter 7 and the first DC/DC converter 5 to the load feed bus B. In a period other than deceleration of a vehicle, if the state of the mode B can be kept for as a long time as possible, the time proportion of the mode C can be reduced, whereby the fuel efficiency can be improved. Therefore, in the mode B, it is desirable that energy of the second electric storage device 6 is transferred to the load feed bus B with low loss. It is found that, to achieve this, the electric generation bus voltage Va that maximizes a combined power conversion efficiency of the first DC/DC converter 5 and the second DC/DC converter 7 may be used as a target value. At this time, since the electric generator 1 has stopped its electric generation, the optimum electric generation bus voltage Va as a target value does not depend on the rotation rate of the electric generator 1.

3. Case of Mode C (Second Electric Storage Device Non-Charging/Discharging Mode)

In the mode C, as shown in FIG. 4, the second DC/DC converter 6 stops its operation and the electric generator 1 generates only power of an amount needed for supplying power to the load feed bus B side. Therefore, in order to improve the fuel efficiency in the mode C, it is desirable that the electric generation efficiency of the electric generator 1 and the power conversion efficiency of the efficiency first DC/DC converter 5 are high. In this case, since generally, the electric generation efficiency of the electric generator 1 is low in comparison with the power conversion efficiency of the DC/DC converter, improving the electric generation efficiency of the electric generator 1 provides a larger effect of improvement in the fuel efficiency.

Figure 7:
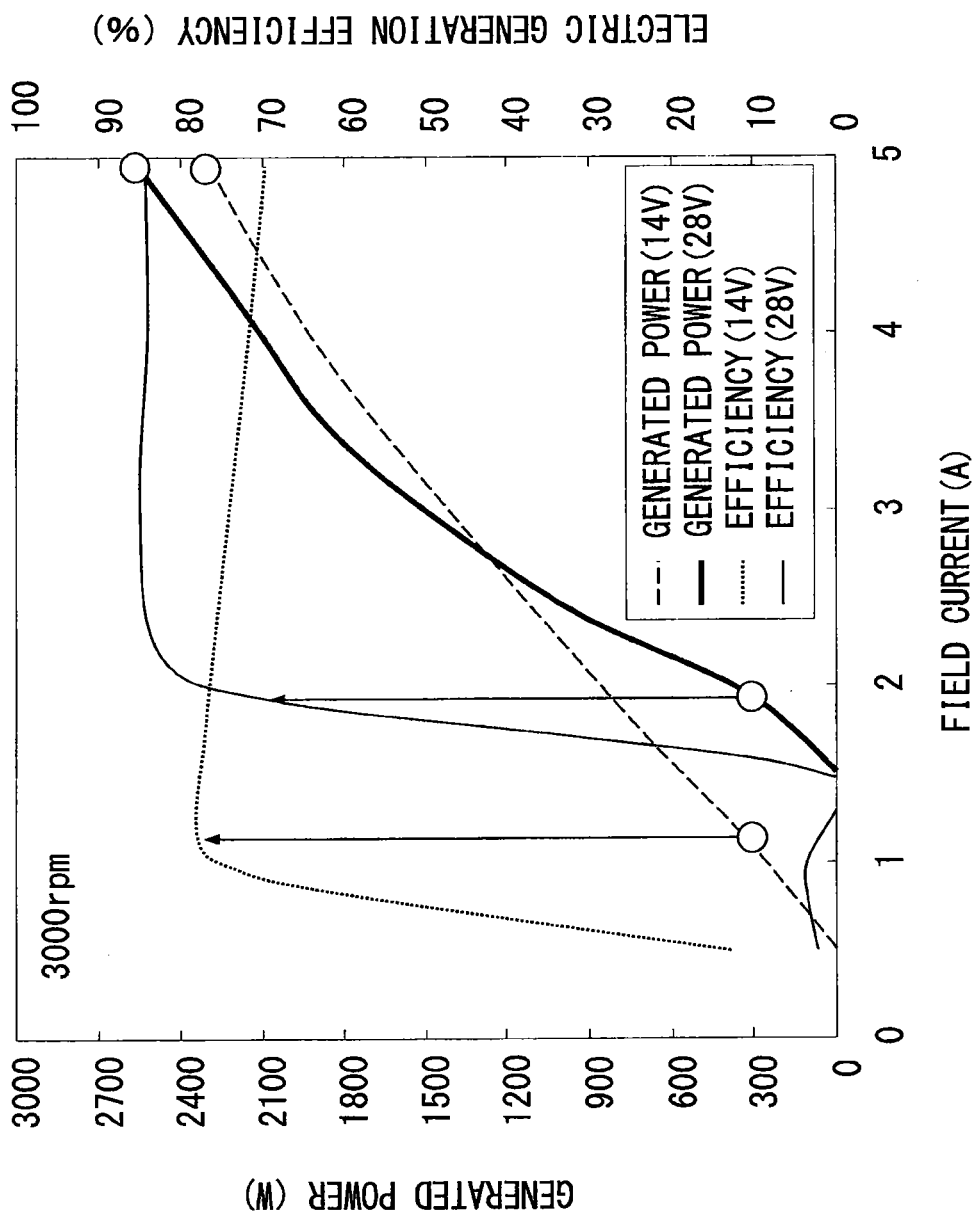
FIG. 7 is a characteristic diagram showing generated power and the electric generation efficiency relative to the field current of the electric generator used in the power supply system for vehicle of the present invention.

FIG. 7 is a characteristic diagram showing the relationship between the generated power (the vertical axis on the left side in FIG. 7) and the electric generation efficiency (the vertical axis on the right side in FIG. 7) relative to the field current, when the electric generation bus voltage Va is 14V and 28V, upon electric generation of the electric generator 1. It is noted that the rotation rate of the electric generator 1 in this case is fixed.

From FIG. 7, it is found that in the mode A which requires generation of large power, the condition for generating the highest power is that the electric generation bus voltage Va is set to be 28V at the maximum field current.

On the other hand, in the mode C, only power to be supplied to the load feed bus B needs to be generated, and therefore the needed power is smaller than that in the mode A. For example, in the case where the generated power of the electric generator 1 needed in the mode C is 300 W, it is found that the electric generation efficiency when the electric generation bus voltage Va is 14V and the field current of the electric generator 1 is 1.2 A is higher than that when the electric generation bus voltage Va is 28V and the field current of the electric generator 1 is 2 A. A remarkable point here is that the optimum electric generation bus voltage Va is not the same between the mode A which targets the maximum generated power of the electric generator 1 and the mode C which targets the maximum electric generation efficiency of the electric generator 1.

Figure 8:
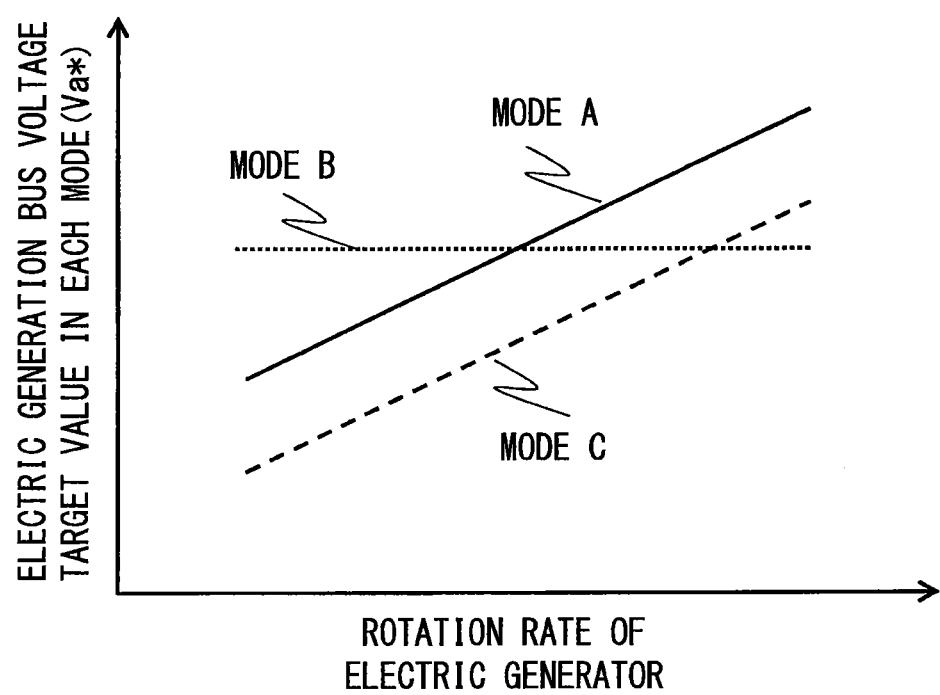
FIG. 8 is a characteristic diagram showing the relationship of optimum electric generation bus voltage relative to the rotation rate of the electric generator, which is determined in accordance with the charging/discharging condition (modes A to C) of the second electric storage device used in the power supply system for vehicle of the present invention.

FIG. 8 is a characteristic diagram showing the way to set a target value (hereinafter, referred to as an electric generation bus voltage target value Va*) for obtaining the optimum electric generation bus voltage Va at each rotation rate of the electric generator 1, so as to be adapted to each of the modes A to C.

In the mode A and the mode C, the electric generation bus voltage target value Va* is determined depending on the rotation rate of the electric generator 1. Particularly, in the mode A, the electric generation bus voltage target value Va* may be set so as to obtain the maximum generated power Pa in accordance with the rotation rate of the electric generator 1. In addition, in the mode C, since the electric generation efficiency of the electric generator 1 differs depending on the generated power supplied to the load feed bus B and the field current of the electric generator 1 as shown in FIG. 7, the electric generation bus voltage target value Va* may be set so as to obtain the maximum electric generation efficiency by using the generated power supplied to the load feed bus B and the field current as additional parameters, together with the rotation rate of the electric generator 1. In addition, in the mode B, since the electric generation bus voltage target value Va* does not depend on the rotation rate of the electric generator 1, the electric generation bus voltage target value Va* may be set in consideration of the power conversion efficiencies of the first and second DC/DC converters 5 and 7.

The easiest way for thus setting the optimum electric generation bus voltage target value Va* adapted to each of the modes A to C is to prepare in advance, in a memory of the control circuit 8, a table in which the optimum electric generation bus voltage target value Va* has been set and registered for each of the modes A to C in accordance with parameters such as the rotation rate, the generated power, and the field current of the electric generator 1, and determine the optimum electric generation bus voltage target value Va* from detected parameters, for each of the modes A to C.

Then, if the optimum electric generation bus voltage target value Va* can be set for each of the modes A to C, it becomes possible to uniquely keep the electric generation bus voltage Va at a predetermined electric generation bus voltage target value Va* by controlling the first DC/DC converter 5 as described above.

Figure 9:
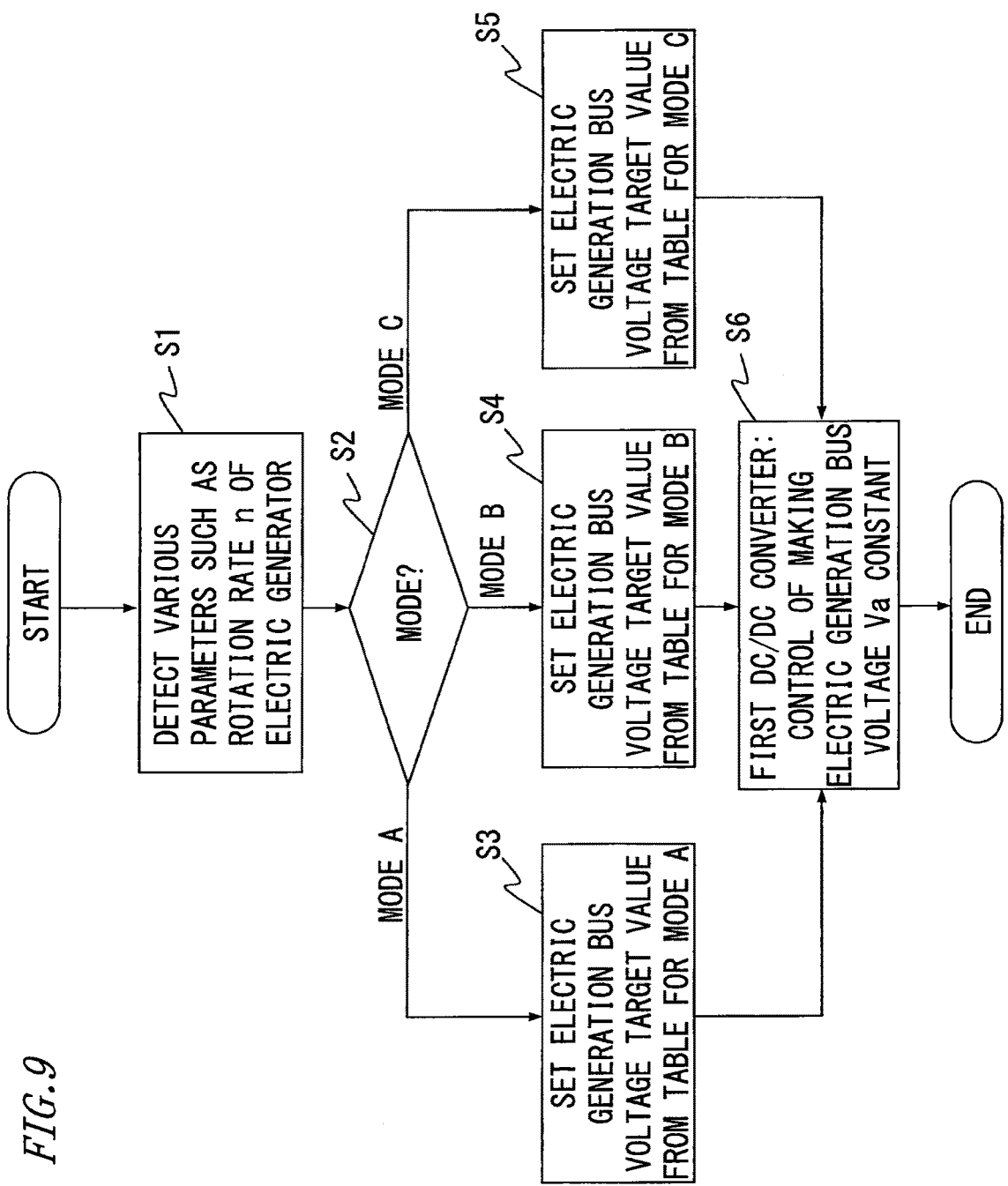
FIG. 9 is a control flow showing control processing of a first DC/DC converter performed in accordance with the charging/discharging condition (modes A to C) of the second electric storage device used in the power supply system for vehicle of the present invention.

Next, control of the first DC/DC converter 5 by the control circuit 8 for keeping the electric generation bus voltage Va at a predetermined electric generation bus voltage target value Va* will be described with reference to a control flow shown in FIG. 9. It is noted that a character S in the following description means a processing step.

A control routine from start to end is executed every control cycle. When the control routine is started, the control circuit 8 detects various parameters such as the rotation rate of the electric generator 1 and the electric generation bus voltage Va which are needed for the control (S1). Next, which the present state is of the above modes A to C is determined (S2), and then if the present state is the mode A, the electric generation bus voltage target value Va* is set from the table for the mode A (S3). In addition, if the present state is the mode B, the electric generation bus voltage target value Va* is set from the table for the mode B (S4). Further, if the present state is the mode C, the electric generation bus voltage target value Va* is set from the table for the mode C (S5). After the electric generation bus voltage target value Va* is thus set, the control circuit 8 performs feedback control for the first DC/DC converter 5 by proportional integral control or the like, so as to eliminate the deviation between the electric generation bus voltage target value Va* and the detected electric generation bus voltage Va (S6).

It is noted that a control routine for determining which the present state is of the modes A to C, a control routine for controlling electric generation of the electric generator 1, and a control routine of the second DC/DC converter 7 for controlling charging and discharging of the second electric storage device 6, are each executed every control cycle. There are various conceivable ways for performing these control routines. However, the main point of the present invention is how to set the target value Va* of the optimum electric generation bus voltage for each of the modes A to C by control of the first DC/DC converter 5, in view of improvement in the fuel efficiency of a vehicle. Therefore, the detailed description of the ways for the above control routines is omitted here.

In addition, here, the electric generation bus voltage target value Va* is determined based on algorithms different among the modes A to C which are classified by the charging/discharging state of the second electric storage device 6. That is, for example, in the case shown in FIG. 8, three lines are used because algorithms for setting the electric generation bus voltage target value Va* are different among the modes A to C. However, the present invention is not limited thereto. For example, the electric generation bus voltage target value Va* can be also set by the same algorithm in the mode A and the mode C (in this case, two lines are used in FIG. 8 because the number of algorithms is two).

As described above, according to the present embodiment, the target value Va* of the optimum electric generation bus voltage can be set for each of the modes A to C classified by the charging/discharging state of the second electric storage device 6. Therefore, in the mode A, the amount of regenerative power can be increased, in the mode B, energy stored in the second electric storage device 6 can be transferred to the in-vehicle load 3 with small loss, and in the mode C, power can be transferred to the in-vehicle load 3 with small loss of energy of gasoline. Thus, the fuel efficiency of a vehicle can be improved as a whole.

In the above description, the control circuit 8 sets the electric generation bus voltage target value by detecting the rotation rate of the electric generator 1. Instead, considering that the rotation rate of the electric generator 1 is proportional to the rotation rate of the engine, the electric generation bus voltage target value may be set by detecting the rotation rate of the engine.

Embodiment 2

Figure 10:
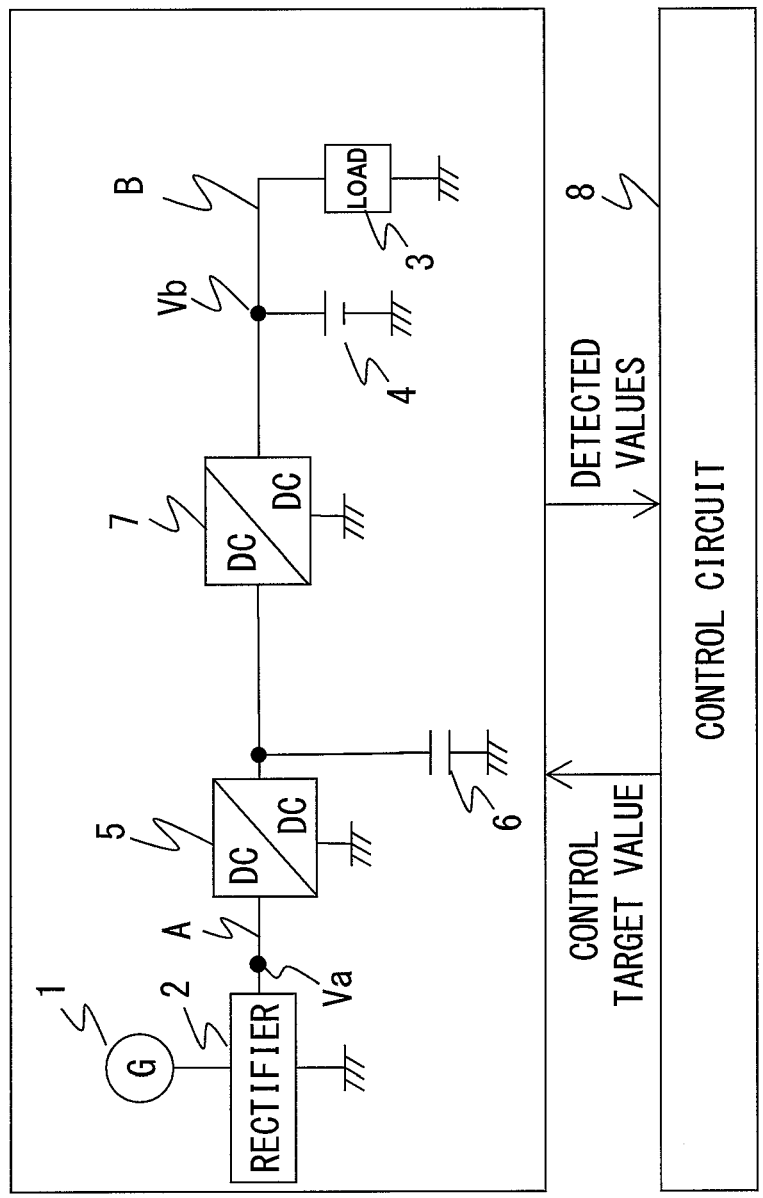
FIG. 10 is a block diagram showing the configuration of a power supply system for vehicle according to embodiment 2 of the present invention.

FIG. 10 is a block diagram showing the configuration of a power supply system for vehicle according to embodiment 2 of the present invention. Components of this power supply system for vehicle are basically the same as those of embodiment 1, but the connection relationships of the first DC/DC converter and the second DC/DC converter with respect to the other components are different from those of embodiment 1.

The power supply system for vehicle of embodiment 2 includes: an electric generator 1 driven by an engine (not shown), for generating AC power; a rectifier 2 for rectifying AC power generated by the electric generator 1 to DC power and outputting the DC power to an electric generation bus A; a first electric storage device 4 for supplying power to an in-vehicle load 3 via a load feed bus B; a second electric storage device 6 for storing generated power from the electric generator 1, thereby absorbing power variation; a first DC/DC converter 5 having a first end (input end) connected to the electric generation bus A and a second end (output end) connected to the second electric storage device 6; a second DC/DC converter 7 having a first end (input end) connected to the second electric storage device 6 and a second end (output end) connected to the load feed bus B; and a control circuit 8 for controlling the electric generator 1, the first DC/DC converter 5, and the second DC/DC converter 7.

The details of the electric generator 1, the first electric storage device 4, the second electric storage device 6, and the first DC/DC converter 5 are the same as those described in embodiment 1.

As the second DC/DC converter 7, a DC/DC converter of a constant current type that keeps current flowing for the voltage of the load feed bus B required by a load at a predetermined target value, is applied. As such a DC/DC converter of a constant current type, a general DC/DC converter circuit such as a step-up/down chopper circuit which is controlled by feedback control so as to keep the current for the voltage of the load feed bus B at target current, can be used. In addition, the second DC/DC converter 7 can be regarded as a DC/DC converter having a high input impedance because the second DC/DC converter 7 operates to keep input current to be constant irrespective of voltage.

Here, when the electric generator 1, the rectifier 2, and the first DC/DC converter 5 are connected to the electric generation bus A, the internal impedances of the electric generator 1 and the rectifier 2 are sufficiently higher than that of the first DC/DC converter 5. Therefore, electric generation bus voltage Va can be set at a predetermined value by only controlling the first DC/DC converter 5 having the lowest input impedance. That is, the electric generation bus voltage Va can be kept at predetermined voltage by the control circuit 8 controlling the first DC/DC converter 5.

The control circuit 8 detects and obtains the rotation rate of the rotor of the electric generator 1, the electric generation bus voltage Va applied to the electric generation bus A, load feed voltage Vb applied to the load feed bus B, voltage Vedlc of the second electric storage device 6, and output current of the second DC/DC converter 7, and controls the electric generator 1, the first DC/DC converter 5, and the second DC/DC converter 7, based on the detected values. Particularly, as a feature of embodiment 2, as described later in detail, since optimum electric generation bus voltage Va for the electric generator 1 differs depending on the charging/discharging condition (modes A to C) of the second electric storage device 6 upon travelling of a vehicle, the first DC/DC converter 5 is controlled so that optimum electric generation bus voltage Va corresponding to the charging/discharging condition (modes A to C) of the second electric storage device 6 can be obtained stably.

In the power supply system for vehicle configured as described above, the following three states (modes A to C) occur depending on the charging/discharging condition of the second electric storage device 6 upon travelling of a vehicle. Hereinafter, the characteristics of the modes A to C will be described with reference to FIGS. 5 and 11 to 13.

Figure 11:
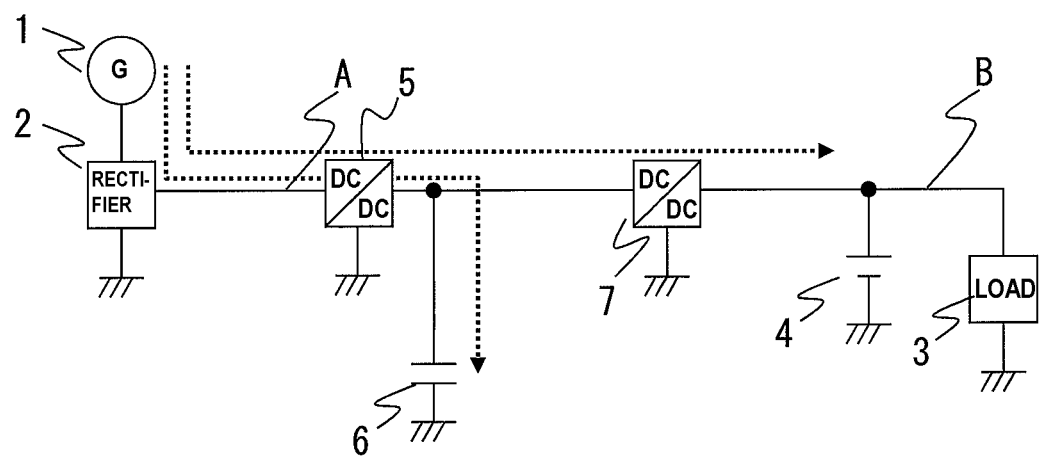
FIG. 11 is an explanation diagram showing an energy flow in a second electric storage device charging mode (A mode) in the power supply system for vehicle of embodiment 2.
Figure 12:
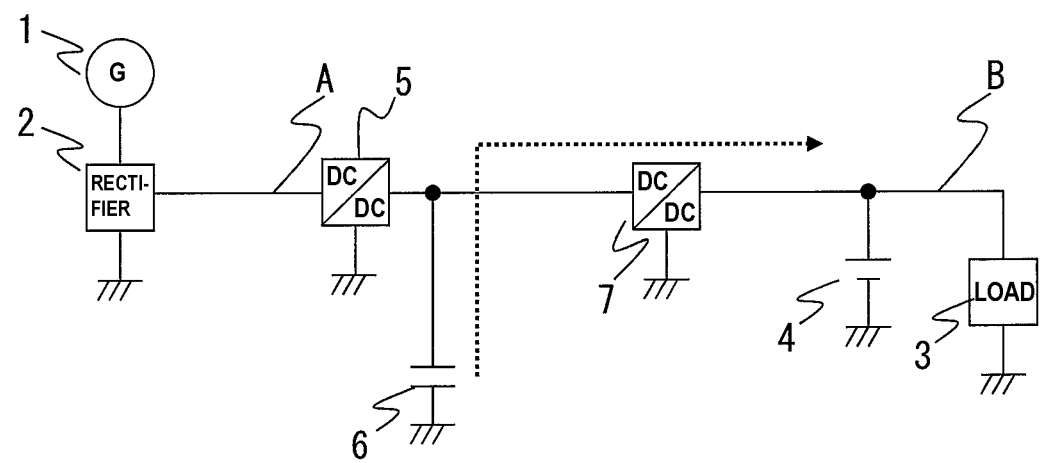
FIG. 12 is an explanation diagram showing an energy flow in a second electric storage device discharging mode (B mode) in the power supply system for vehicle of embodiment 2.
Figure 13:
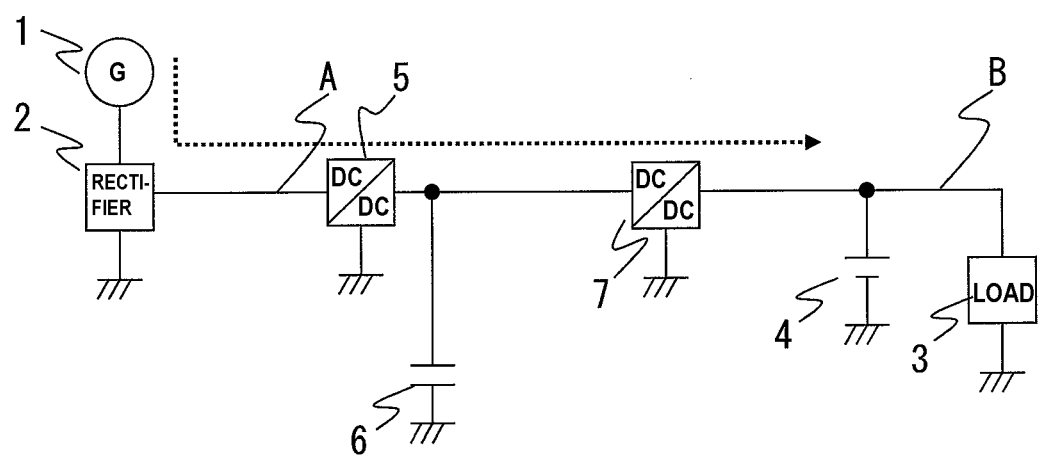
FIG. 13 is an explanation diagram showing an energy flow in a second electric storage device non-charging/discharging mode (C mode) in the power supply system for vehicle of embodiment 2.

FIGS. 11 to 13 are diagrams showing flows of energy in the respective modes A to C in the power supply system for vehicle of the present embodiment. In addition, FIG. 5 shows variation in a vehicle velocity, and generated power Pa of the electric generator 1, charging/discharging power Pc of the second electric storage device 6, and supply power Pb to the load feed bus B associated with the variation. It is noted that the generated power Pa of the electric generator 1 is equal to a value obtained by summing the supply power Pb to the load feed bus B and the charging/discharging power Pc of the second electric storage device 6.

1. Mode A (Second Electric Storage Device Charging Mode)

The mode A mainly occurs upon deceleration of a vehicle (for example, in a period from a time t1 to a time t2 in FIG. 5). That is, when a vehicle decelerates, the control circuit 8 controls the electric generator 1 and the second DC/DC converter 7, by giving instructions to them, so as to charge the second electric storage device 6 with the differential power between the generated power Pa of the electric generator 1 and the supply power Pb to the load feed bus B. As a result, as shown in FIG. 11, energy generated by the electric generator 1 transfers through the first DC/DC converter 5 and the second DC/DC converter 7 to the load feed bus B, and also transfers through the first DC/DC converter 5 to the second electric storage device 6. At this time, since the source of regenerative energy generated by the electric generator 1 is kinetic energy based on the mass and the velocity of the vehicle, energy of gasoline which is a fuel is not consumed. If the regeneration of energy to the second electric storage device 6 upon deceleration of a vehicle is performed in a short time and with large power, the amount of regenerative power can be increased, and therefore the fuel efficiency can be more improved. Therefore, in the mode A, it is desirable that the transfer of the generated power of the electric generator 1 to the second electric storage device 6 and the load feed bus B is performed in the state where the electric generator 1 can generate as large power as possible.

It is noted that there are cases that the mode A does not occur even upon deceleration, depending on other states. For example, such cases include the case where the voltage of the second electric storage device 6 (for example, an electric double layer capacitor) has reached its upper limit voltage so that the second electric storage device 6 cannot be charged any longer, and the case where the maximum generated power of the electric generator 1 is equal to power to be supplied to the load feed bus B and therefore power cannot be supplied to the second electric storage device 6.

2. Mode B (Second Electric Storage Device Discharging Mode)

The mode B mainly occurs in the case where a vehicle is in a state other than deceleration and the second electric storage device 6 is able to discharge (for example, in a period from a time t2 to a time t3 in FIG. 5). That is, when deceleration of a vehicle has ended, the control circuit 8 controls the second DC/DC converter 7 so as to discharge energy of the second electric storage device 6. If the second electric storage device 6 can supply power to the second DC/DC converter 7 side, the control circuit 8 stops supplying current to the field winding of the electric generator 1, and therefore the electric generator 1 stops its electric generation, whereby energy transfers from the second electric storage device 6 to the load feed bus B side as shown in FIG. 12. Thus, in the mode B, since supply of power to the load feed bus B side including the in-vehicle load 3 is performed by the stored energy of the second electric storage device 6, energy of gasoline is not consumed for supplying power to the load feed bus B side. In the mode B, the voltage of the electric generation bus A is not involved and therefore does not need to be particularly considered. It is noted that the mode B ends when the voltage of the second electric storage device 6 has reached its lower limit voltage (a time t3 in FIG. 5) and therefore has become unable to discharge any longer.

3. Mode C (Second Electric Storage Device Non-Charging/Discharging Mode)

The mode C mainly occurs in the case where a vehicle is in a state other than deceleration and the second electric storage device 6 is not able to discharge (for example, in a period from a time t3 to a time t4 in FIG. 5). That is, when the voltage of the second electric storage device 6 has reached its lower limit voltage (a time t3 in FIG. 5) and therefore has become unable to discharge any longer, the control circuit 8 controls the difference between the generated power Pa of the electric generator 1 and the power Pb supplied to the load feed bus B by the second DC/DC converter 7, to be zero, thereby stopping charging/discharging of the second electric storage device 6, so that energy transfers as shown in FIG. 13. At this time, if a vehicle is not decelerating, only energy of gasoline of an amount needed for supplying power to the load feed bus B side is consumed. Therefore, in the mode C, for suppressing energy consumption of gasoline as much as possible, it is desirable that the above operation is performed in the state where the power generation efficiency of the electric generator 1 is maximized.

Then, by optimizing distribution of the modes A and B so as to reduce as much as possible the time proportion of the mode C which consumes energy of gasoline, the fuel efficiency of the system as a whole can be improved. This is a basic principle of fuel efficiency improvement in the system, of embodiment 2.

Here, the difference between embodiment 1 and embodiment 2 in consideration of the transfer route of energy and loss of the DC/DC converters will be described.

In the mode A, in embodiment 1, energy transferring from the electric generator 1 to the second electric storage device 6 passes through the second DC/DC converter 7, and on the other hand, in embodiment 2, passes through the first DC/DC converter 5. That is, in either embodiment, the energy transferring to the second electric storage device 6 passes through the DC/DC converter once. Therefore, loss of the energy due to the DC/DC converter is the same. The number of times energy transferring from the electric generator 1 to the in-vehicle load 3 passes through the DC/DC converter is, in embodiment 1, once for the first DC/DC converter 5, and on the other hand, in embodiment 2, twice for the first DC/DC converter 5 and the second DC/DC converter 7. Thus, loss of the energy due to the DC/DC converter in embodiment 1 is smaller.

In the mode B, the number of times energy transferring from the second electric storage device 6 to the in-vehicle load 3 passes through the DC/DC converter is, in embodiment 1, twice for the first DC/DC converter 5 and the second DC/DC converter 7, and on the other hand, in embodiment 2, once for the second DC/DC converter 7. Thus, loss of the energy due to the DC/DC converter in embodiment 2 is smaller.

In the mode C, the number of times energy transferring from the electric generator 1 to the in-vehicle load 3 passes through the DC/DC converter is, in embodiment 1, once for the first DC/DC converter 5, and on the other hand, in embodiment 2, twice for the first DC/DC converter 5 and the second DC/DC converter 7. Thus, loss of the energy due to the DC/DC converter in embodiment 1 is smaller.

Thus, regarding loss of energy passing through the DC/DC converter, both embodiments have merits and demerits. Therefore, one of the embodiments may be selected in accordance with intended use at the stage of system design. That is, in the case of using the second electric storage device 6 having a small capacity in view of cost, the time proportion of the mode C increases. In this case, embodiment 1 in which loss caused when energy directly transfers from the electric generator 1 to the in-vehicle load 3 is small is more advantageous for the fuel efficiency improvement effect. On the other hand, in the case where the capacity of the second electric storage device 6 can be increased sufficiently, the time proportion of the mode C decreases. In this case, embodiment 2 in which loss caused when the second electric storage device 6 is charged or discharged in the mode A and the mode B is suppressed is more advantageous for the fuel efficiency improvement effect.

Specific ways for optimally setting the electric generation bus voltage Va in accordance with the above respective characteristics required in the modes A to C, and the way of controlling the electric generation bus voltage Va, are the same as in the above embodiment 1. Therefore, the description thereof is omitted.

Embodiment 3

Figure 14:
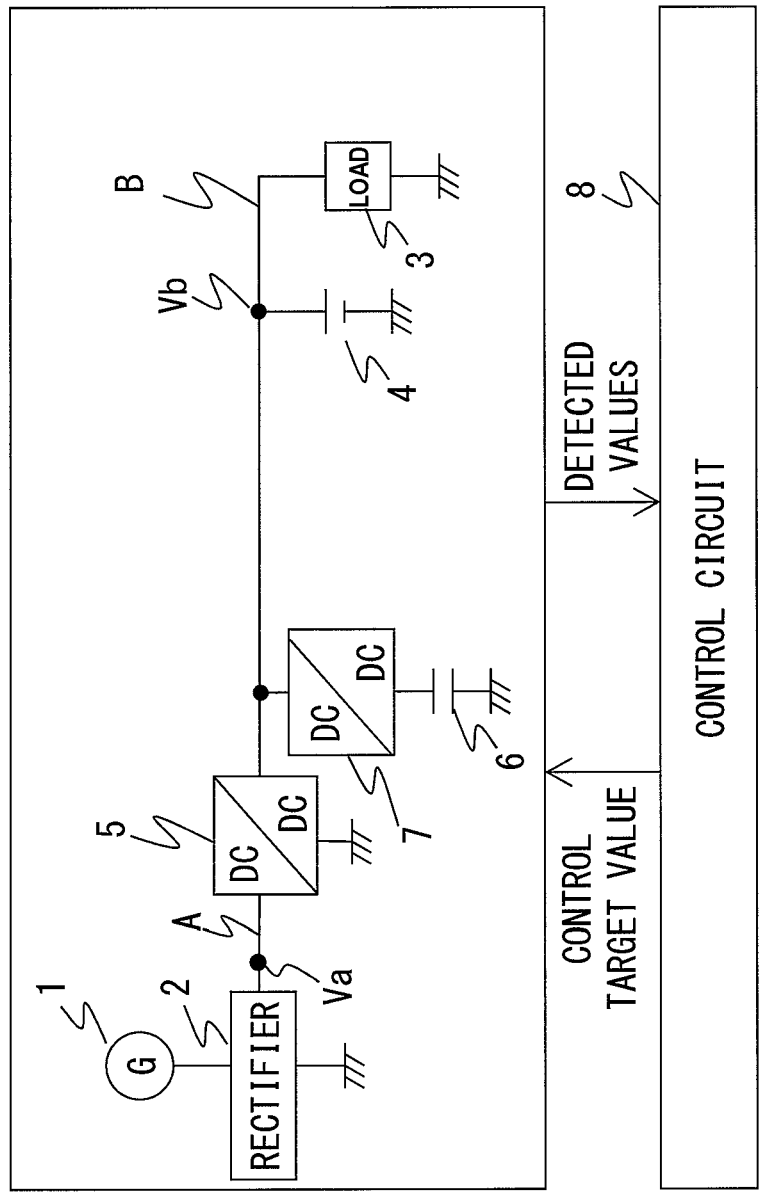
FIG. 14 is a block diagram showing the configuration of a power supply system for vehicle according to embodiment 3 of the present invention.

FIG. 14 is a block diagram showing the configuration of a power supply system for vehicle according to embodiment 3 of the present invention. Components of this power supply system for vehicle are basically the same as those of embodiment 1, but the connection relationships of the first DC/DC converter and the second DC/DC converter with respect to the other components are different from those of embodiment 1.

The power supply system for vehicle of embodiment 3 includes: an electric generator 1 driven by an engine (not shown), for generating AC power; a rectifier 2 for rectifying AC power generated by the electric generator 1 to DC power and outputting the DC power to an electric generation bus A; a first electric storage device 4 for supplying power to an in-vehicle load 3 via a load feed bus B; a second electric storage device 6 for storing generated power from the electric generator 1, thereby absorbing power variation; a first DC/DC converter 5 having a first end (input end) connected to the electric generation bus A and a second end (output end) connected to the load feed bus B; a second DC/DC converter 7 having a first end (input end) connected to the second electric storage device 6 and a second end (output end) connected to the load feed bus B; and a control circuit 8 for controlling the electric generator 1, the first DC/DC converter 5, and the second DC/DC converter 7.

The details of the electric generator 1, the first electric storage device 4, the second electric storage device 6, the first DC/DC converter 5, and the second DC/DC converter 7 are the same as those described in embodiment 1.

Here, when the electric generator 1, the rectifier 2, and the first DC/DC converter 5 are connected to the electric generation bus A, the internal impedances of the electric generator 1 and the rectifier 2 are sufficiently higher than that of the first DC/DC converter 5. Therefore, electric generation bus voltage Va can be set at a predetermined value by only controlling the first DC/DC converter 5 having the lowest input impedance. That is, the electric generation bus voltage Va can be kept at predetermined voltage by the control circuit 8 controlling the first DC/DC converter 5.

The control circuit 8 detects and obtains the rotation rate of the rotor of the electric generator 1, the electric generation bus voltage Va applied to the electric generation bus A, load feed voltage Vb applied to the load feed bus B, voltage Vedlc of the second electric storage device 6, and current Ic of the second DC/DC converter 7 upon charging or discharging of the second electric storage device 6, and controls the electric generator 1, the first DC/DC converter 5, and the second DC/DC converter 7, based on the detected values. Particularly, as a feature of embodiment 3, as described later in detail, since optimum electric generation bus voltage Va for the electric generator 1 differs depending on the charging/discharging condition (modes A to C) of the second electric storage device 6 upon travelling of a vehicle, the first DC/DC converter 5 is controlled so that optimum electric generation bus voltage Va corresponding to the charging/discharging condition (modes A to C) of the second electric storage device 6 can be obtained stably.

In the power supply system for vehicle configured as described above, the following three states (modes A to C) occur depending on the charging/discharging condition of the second electric storage device 6 upon travelling of a vehicle. Hereinafter, the characteristics of the modes A to C will be described with reference to FIGS. 5 and 15 to 17.

Figure 15:
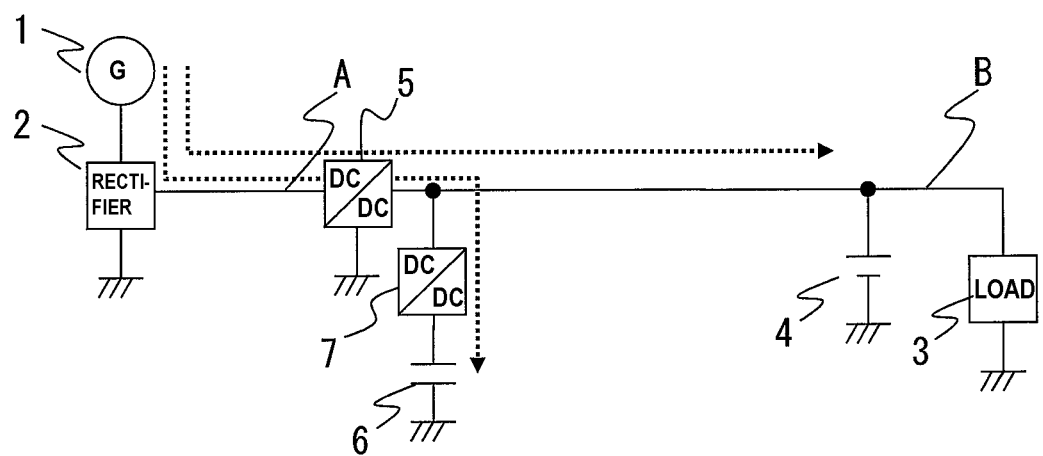
FIG. 15 is an explanation diagram showing an energy flow in a second electric storage device charging mode (A mode) in the power supply system for vehicle of embodiment 3.
Figure 16:
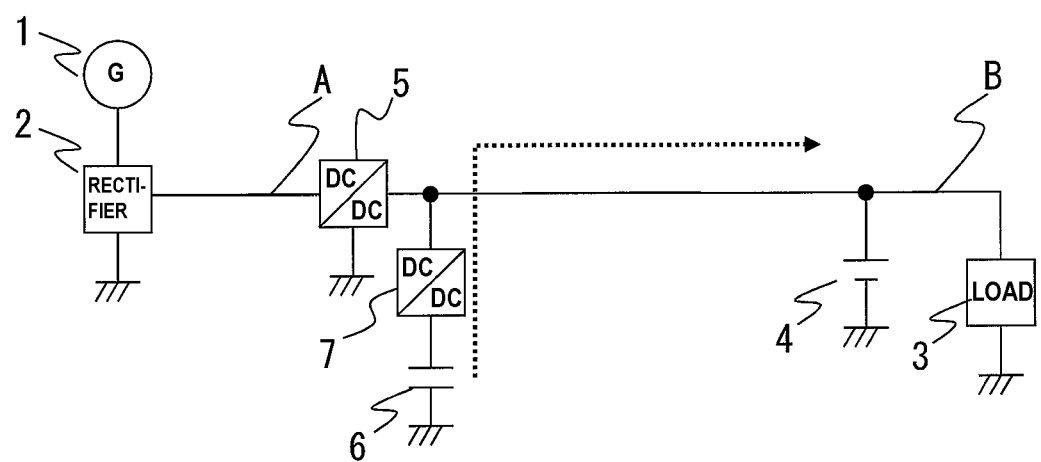
FIG. 16 is an explanation diagram showing an energy flow in a second electric storage device discharging mode (B mode) in the power supply system for vehicle of embodiment 3.
Figure 17:
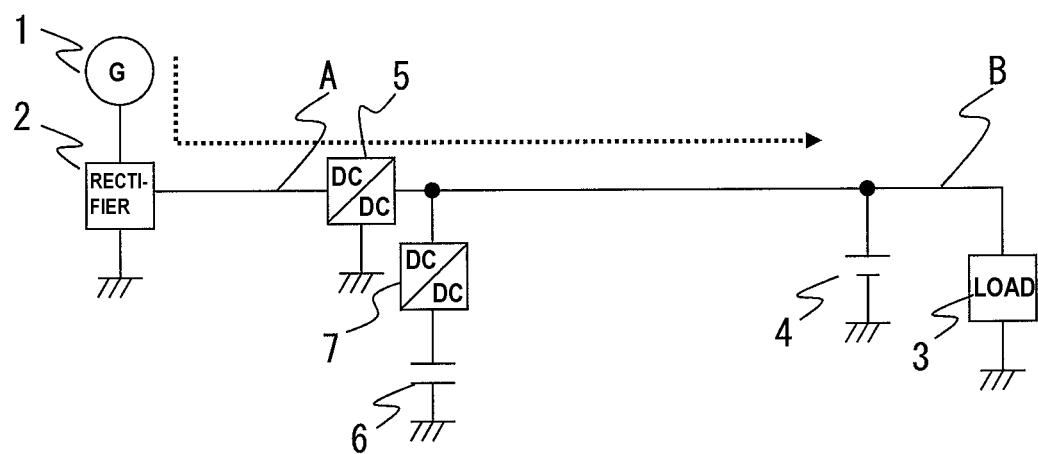
FIG. 17 is an explanation diagram showing an energy flow in a second electric storage device non-charging/discharging mode (C mode) in the power supply system for vehicle of embodiment 3.

FIGS. 15 to 17 are diagrams showing flows of energy in the respective modes A to C in the power supply system for vehicle of embodiment 3. In addition, FIG. 5 shows variation in a vehicle velocity, and generated power Pa of the electric generator 1, charging/discharging power Pc of the second electric storage device 6, and supply power Pb to the load feed bus B associated with the variation. It is noted that the generated power Pa of the electric generator 1 is equal to a value obtained by summing the supply power Pb to the load feed bus B and the charging/discharging power Pc of the second electric storage device 6.

1. Mode A (Second Electric Storage Device Charging Mode)

The mode A mainly occurs upon deceleration of a vehicle (for example, in a period from a time t1 to a time t2 in FIG. 5). That is, when a vehicle decelerates, the control circuit 8 controls the second DC/DC converter 7 so as to charge the second electric storage device 6. As a result, as shown in FIG. 15, energy generated by the electric generator 1 transfers through the first DC/DC converter 5 to the load feed bus B, and also transfers through the second DC/DC converter 7 to the second electric storage device 6. At this time, since the source of regenerative energy generated by the electric generator 1 is kinetic energy based on the mass and the velocity of the vehicle, energy of gasoline is not consumed. If the regeneration of energy to the second electric storage device 6 upon deceleration is performed in a short time and with large power, the amount of regenerative power can be increased, and therefore the fuel efficiency can be more improved. Therefore, in the mode A, it is desirable that the transfer of the generated power of the electric generator 1 to the second electric storage device 6 and the load feed bus B is performed in the state where the electric generator 1 can generate as large power as possible.

It is noted that there are cases that the mode A does not occur even upon deceleration, depending on other states. For example, such cases include the case where the voltage of the second electric storage device 6 (for example, an electric double layer capacitor) has reached its upper limit voltage so that the second electric storage device 6 cannot be charged any longer, and the case where the maximum generated power of the electric generator 1 is equal to power to be supplied to the load feed bus B and therefore power cannot be supplied to the second electric storage device 6.

2. Mode B (Second Electric Storage Device Discharging Mode)

The mode B mainly occurs in the case where a vehicle is in a state other than deceleration and the second electric storage device 6 is able to discharge (for example, in a period from a time t2 to a time t3 in FIG. 5). That is, when deceleration of a vehicle has ended, the control circuit 8 controls the second DC/DC converter 7 so as to discharge energy of the second electric storage device 6. In this case, the control circuit 8 stops supplying current to the field winding of the electric generator 1, and therefore the electric generator 1 stops its electric generation, whereby energy transfers from the second electric storage device 6 to the load feed bus B side as shown in FIG. 16. Thus, in the mode B, since supply of power to the load feed bus B side including the in-vehicle load 3 is performed by the stored energy of the second electric storage device 6, energy of gasoline is not consumed for supplying power to the load feed bus B side. In the mode B, the electric generation bus A is not involved and therefore does not need to be particularly considered. It is noted that the mode B ends when the voltage of the second electric storage device 6 has reached its lower limit voltage (a time t3 in FIG. 5) and therefore has become unable to discharge any longer.

3. Mode C (Second Electric Storage Device Non-Charging/Discharging Mode)

The mode C mainly occurs in the case where a vehicle is in a state other than deceleration and the second electric storage device 6 is not able to discharge (for example, in a period from a time t3 to a time t4 in FIG. 5). That is, when the voltage of the second electric storage device 6 has reached its lower limit voltage (a time t3 in FIG. 5) and therefore has become unable to discharge any longer, the control circuit 8 stops operation of the second DC/DC converter 7. In addition, in this case, since current is supplied to the field winding of the electric generator 1, the electric generator 1 generates only power of an amount needed for supplying power to the load feed bus B, so that energy transfers as shown in FIG. 17. At this time, if a vehicle is not decelerating, only energy of gasoline of an amount needed for supplying power to the load feed bus B side is consumed. Therefore, in the mode C, for suppressing energy consumption of gasoline as much as possible, it is desirable that the above operation is performed in the state where the power generation efficiency of the electric generator 1 is maximized.

Then, by optimizing distribution of the modes A and B so as to reduce as much as possible the time proportion of the mode C which consumes energy of gasoline, the fuel efficiency of the system as a whole can be improved. This is a basic principle of fuel efficiency improvement in the system of embodiment 3.

Here, the difference between embodiment 1 and embodiment 3 in consideration of the transfer route of energy and loss of the DC/DC converters will be described.

In the mode A, the number of times energy transferring from the electric generator 1 to the second electric storage device 6 passes through the DC/DC converter is, in embodiment 1, once for the second DC/DC converter 7, and on the other hand, in embodiment 3, twice for the first DC/DC converter 5 and the second DC/DC converter 7. Thus, loss of the energy due to the DC/DC converter in embodiment 1 is smaller. In either embodiment, energy transferring from the electric generator 1 to the in-vehicle load 3 passes through the DC/DC converter once. Therefore, loss of the energy due to the DC/DC converter is the same.

In the mode B, the number of times energy transferring from the second electric storage device 6 to the in-vehicle load 3 passes through the DC/DC converter is, in embodiment 1, twice for the second DC/DC converter 7 and the first DC/DC converter 5, and on the other hand, in embodiment 3, once for the second DC/DC converter 7. Thus, loss of the energy due to the DC/DC converter in embodiment 3 is smaller.

In the mode C, in both embodiments 1 and 3, the number of times energy transferring from the electric generator 1 to the in-vehicle load 3 passes through the DC/DC converter is once for the first DC/DC converter 5. Therefore, loss of the energy due to the DC/DC converter is the same.

Thus, regarding loss of energy passing through the DC/DC converter, both embodiments have merits and demerits. Therefore, one of the embodiments may be selected in accordance with intended use at the stage of system design. That is, in the case where the weight of a vehicle is large and therefore sufficiently large deceleration energy can be obtained, embodiment 3 in which loss upon charging of the second electric storage device 6 in the mode A is large but loss upon discharging in the mode B is small, is more advantageous for the fuel efficiency improvement effect. On the other hand, in the case where the weight of a vehicle is small and therefore sufficiently large deceleration energy cannot be obtained, embodiment 1 in which loss upon charging of the second electric storage device 6 in the mode A is small so that a large amount of deceleration energy can be retrieved, is more advantageous for the fuel efficiency improvement effect.

Specific ways for optimally setting the electric generation bus voltage Va in accordance with the above respective characteristics required in the modes A to C, and the way of controlling the electric generation bus voltage Va, are the same as in embodiment 1. Therefore, the description thereof is omitted.

The invention claimed is:

1. A power supply system for a vehicle, comprising:
an electric generator driven by an engine to generate AC power;
a rectifier to rectify the AC power generated by the electric generator to DC power and to output the DC power to an electric generation bus;
a first electric storage device having one terminal directly connected to a load feed bus and another terminal connected to ground, the first electric storage device being configured to supply power to an in-vehicle load via the load feed bus;
a second electric storage device to absorb generated power from the electric generator, thereby absorbing power variation;
a first DC/DC converter of a constant voltage control type, directly connected to the electric generation bus and controlled to keep an electric generation bus voltage which is the voltage of the electric generation bus, at a target voltage;
a second DC/DC converter of a constant current control type, connected to the second electric storage device and controlled to keep an input current or an output current at predetermined target current; and
a control circuit to perform drive control for the electric generator and the first and the second DC/DC converters to charge the first electric storage device and the second electric storage device with the generated power of the electric generator and discharge energy stored in the second electric storage device, the control circuit including a detector to detect a rotation speed of a rotor of the electric generator,
wherein when the first DC/DC converter transfers electric power from the electric generation bus to the load feed bus the control circuit
in a mode in which the vehicle is in a deceleration state and the second electric storage device is charged, determines the target voltage for the electric generation bus based on the rotation speed of the rotor of the electric generator detected by the detector,
in a mode in which the vehicle is in a state other than deceleration and the second electric storage device is discharged, determines the target voltage for the electric generation bus based on power conversion efficiencies of the first and second DC/DC converters, and in a mode in which the vehicle is in a state other than deceleration and the second electric storage device is not charged or discharged, determines the target voltage for the electric generation bus and field current of the electric generator on the basis of generated power of an amount needed for supplying power to the load feed bus, and controls the first DC/DC converter so that the electric generation bus voltage becomes the determined target voltage to increase fuel efficiency.

2. The power supply system for a vehicle according to claim 1, wherein the first DC/DC converter has a first end connected to the electric generation bus and a second end connected to the load feed bus, and the second DC/DC converter has a first end connected to the electric generation bus and a second end connected to the second electric storage device.

3. The power supply system for a vehicle according to claim 1, wherein the first DC/DC converter has a first end connected to the electric generation bus and a second end connected to the second electric storage device, and the second DC/DC converter has a first end connected to the second electric storage device and a second end connected to the load feed bus.

4. The power supply system for a vehicle according to claim 1, wherein the first DC/DC converter has a first end connected to the electric generation bus and a second end connected to the load feed bus, and the second DC/DC converter has a first end connected to the second electric storage device and a second end connected to the load feed bus.

5. The power supply system for a vehicle according to claim 1, wherein the control circuit determines the target voltage of the electric generation bus voltage, by referring to tables in which target values of the electric generation bus voltage are stored in advance based on the plurality of modes determined by the charging/discharging condition of the second electric storage device.

6. The power supply system for a vehicle according to claim 5, wherein the tables associate target values of the electric generation bus voltage with at least one of a rotation rate of the electric generator, a generated power, and a field current of the electric generator.

* * * * *